United States Patent [19]
Fleming

[11] Patent Number: 5,422,993
[45] Date of Patent: Jun. 6, 1995

[54] METHOD AND SYSTEM FOR PERFORMING DIRECT MANIPULATION OPERATIONS IN A COMPUTER SYSTEM

[75] Inventor: Stephen S. Fleming, Dallas, Tex.

[73] Assignee: International Business Machines Corporation, Armonk, N.Y.

[21] Appl. No.: 808,858

[22] Filed: Dec. 17, 1991

[51] Int. Cl.⁶ ............................................. G06F 3/033
[52] U.S. Cl. .................................... 395/159; 345/163; 364/DIG. 2; 364/929.12
[58] Field of Search ....................... 395/155, 157, 159; 364/190, 188; 345/157, 163, 167; 340/710, 724

[56] References Cited

U.S. PATENT DOCUMENTS

| | | | |
|---|---|---|---|
| 4,627,015 | 12/1986 | Stephens | 395/147 |
| 4,984,152 | 1/1991 | Muller | 395/153 |
| 5,122,654 | 6/1992 | Koh et al. | 250/221 |
| 5,196,838 | 3/1993 | Meier et al. | 340/724 |

OTHER PUBLICATIONS

Edel, M., "The Tinkertoy Graphical Programming Environment", IEEE Proceedings Compsac, 1986, pp. 299-303.

*Primary Examiner*—Thomas G. Black
*Assistant Examiner*—John C. Loomis
*Attorney, Agent, or Firm*—Jonathan E. Jobe; Andrew J. Dillon

[57] ABSTRACT

Disclosed are a method and system for directly manipulating an icon in a data processing system. The method includes attaching a visual pointer to the icon and moving the pointer with the icon attached thereto about the display screen. While the pointer remains attached to the icon, the user can manipulate other software objects.

12 Claims, 6 Drawing Sheets

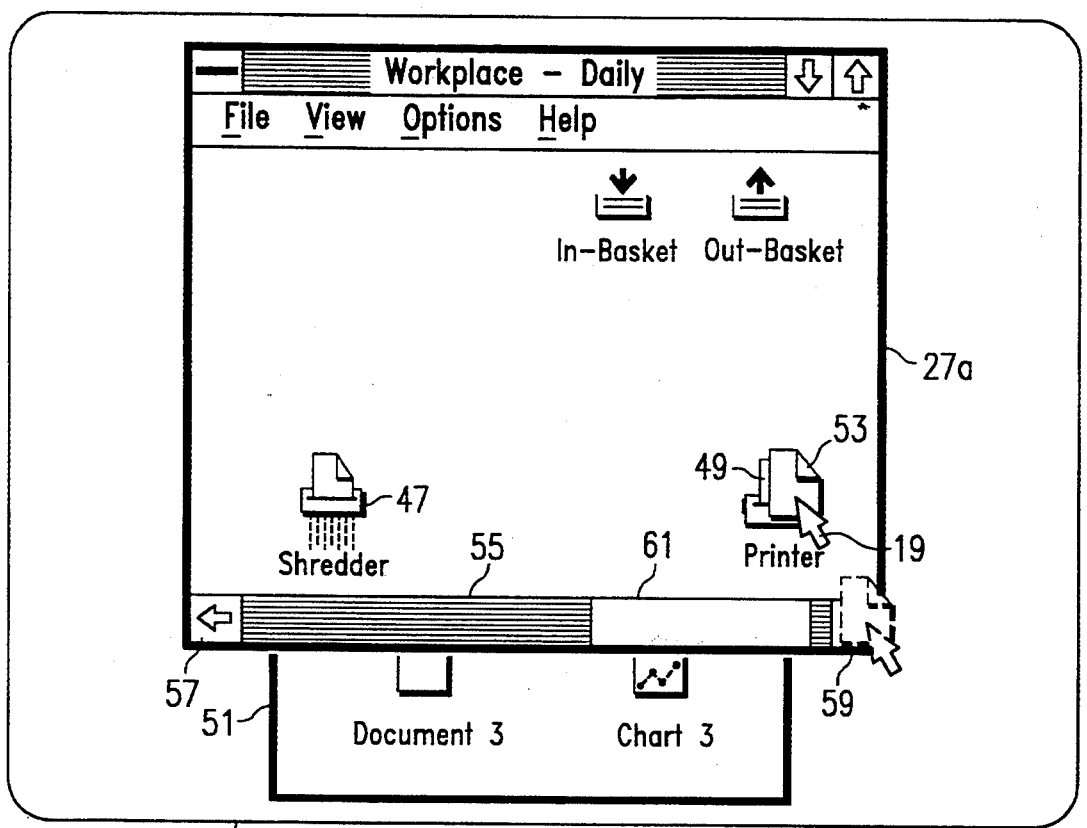
FIG. 7
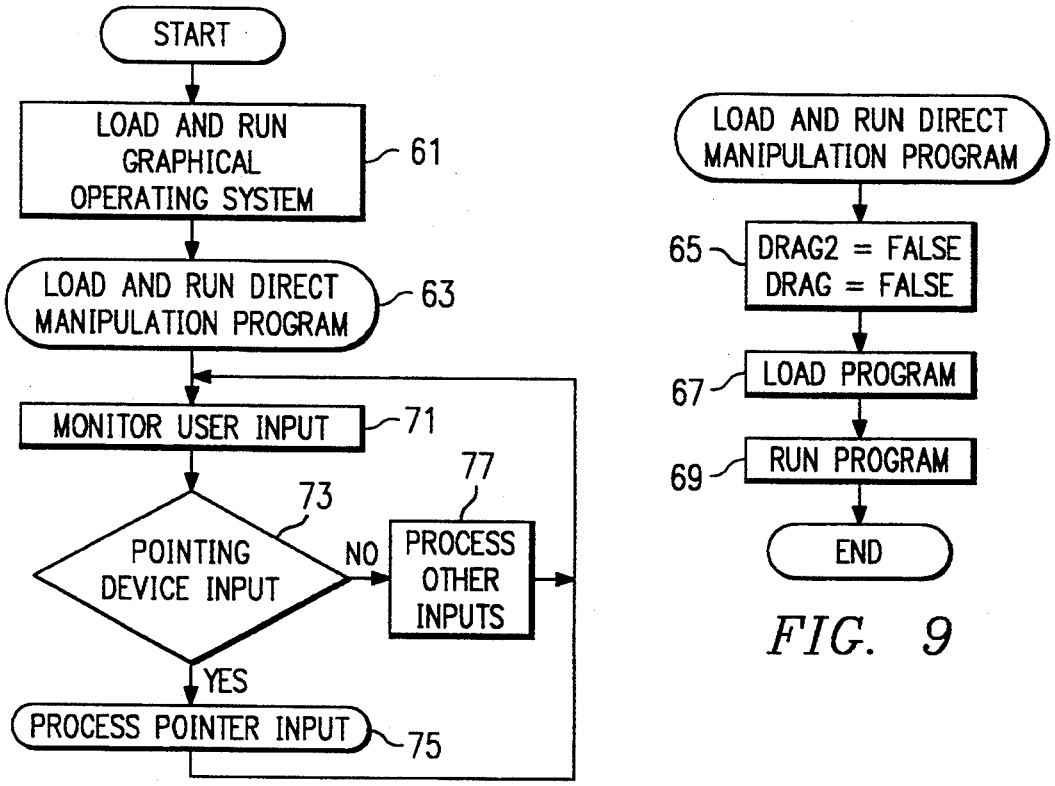
FIG. 8
FIG. 9

METHOD AND SYSTEM FOR PERFORMING DIRECT MANIPULATION OPERATIONS IN A COMPUTER SYSTEM

BACKGROUND OF THE INVENTION

1. Field of the Invention

The present invention relates generally to graphical user interfaces in computer systems, and, more particularly, to a method and system for performing direct manipulation operations in a graphical user interface.

2. Description of the Prior Art

Presently existing graphical user interfaces typically include a plurality of selectable visual icons that represent software objects, including documents and files, as well as software applications, such as text editors and spreadsheets, and operations such as printing, deleting, or filing. As a practical matter, nearly any software document or operation can be visually represented by a selectable visual icon.

One of the great promises of graphical user interfaces lies in their intuitive nature. Users can draw on their real world experiences in performing various tasks in the electronic workplace created by the graphical user interface. For example, in character based user interfaces, if the user wishes to print a document, the user must know and be able to type an appropriate command or series of commands. In contrast, with a graphical user interface, the user can, with a mouse or other pointing device, drag an icon that represents the document the user wishes to print across the computer display screen and drop the document icon on another icon that represents a printer. Similarly, if the user wishes to file the electronic document in a particular file, the user may simply drag the icon that represents the document and drop it on the appropriate file icon.

A drawback to presently existing direct manipulation techniques is the requirement that both the source icon and the target location or icon must be simultaneously visible. As a practical matter, the source and target objects are rarely visible at the same time. Therefore, in a substantial number of cases, the user must painstakingly rearrange the items on the display screen to simultaneously expose both the source and target objects prior to initiating the direct manipulation operation. The necessary rearrangement is made even more difficult because in currently existing implementations, it is as if the user is able only to use one hand. For example, in the real world, the simple task of moving a document from one folder to another in a file drawer would be very tedious if the user were allowed or able to use only one hand. First, the user would open the file folder containing the document and then remove the document. However, since the user can use only one hand, the user would have to set the document down somewhere convenient, such as his desktop, in order to free his hand to open the other folder. Next the user would have to go back to the desktop, pick up the document again and place it in the second folder. A clever person with a relatively empty file drawer might be able to open the second folder and then carefully open the first folder without affecting the second folder. In this case, the person could, with one hand, pick up the document from the first folder and transfer it to the second folder all in one motion. However, this approach requires more steps and is awkward and not intuitive.

Similarly, in presently existing graphical user interfaces, unless the user is very fortunate in the arrangement of items on the display screen, the user must place the source object at some convenient location on the screen and then surface the target object or location. After the user has surfaced the target object or location, assuming that the source object has not become obscured, the user can drag and drop the source on the target.

In co-pending application Ser. No. 07/703,434, filed May 17, 1991, which is assigned to the assignee of the present application, a method is provided for facilitating direct manipulation of selectable visual icons in a data processing system having a plurality of viewports or windows that at least partially overlap each other and obscure certain of the selectable visual icons. When the user begins to drag one of the icons, the system monitors the position of the dragged icon on the display screen. Whenever the dragged icon moves into another window or viewport, the system automatically rearranges the order in which the viewports or windows overlap so that the window or viewport that currently contains the dragged icon is on top of the stack. The foregoing solution solves some, but not all, of the problems associated with the "one-handed" direct manipulation. For example, the foregoing solution assumes that the target location is in a window that is open, but not presently visible on the screen. However, the target location may be in a window that has not yet been opened, or may be in a portion of a window that is not visible even when the window is surfaced, i.e., the user may need to scroll the window to reach the target location. The foregoing solution does not provide a means by which the user can open new windows or scroll data within open windows while dragging a source object.

SUMMARY OF THE INVENTION

The present invention provides a new technique by which users may interact with a graphical user interface while they are performing a direct manipulation operation. In the preferred embodiment of the invention, the system includes a two-button mouse. Mouse button number one is used for selection operations and mouse button number two is used for direct manipulation operations. In the present invention, the user can pick up an object for direct manipulation by clicking mouse button number two while the pointer, the position of which is controlled by the mouse, points to the object. After the object has been picked up by clicking mouse button number two, it will be directly manipulated by movement of the mouse, even though mouse button number two is not pressed. During the direct manipulation operation, the object is visually attached to the pointer. The object will remain attached to the pointer until mouse button number two is clicked again, at which time the object is disconnected from the pointer and dropped on the display screen.

While the pointer is attached to the object, the user can perform operations using mouse button number one. For example, the user may open folders, surface windows, turn pages, scroll data in windows, and perform other operations while the object being directly manipulated remains attached to the pointer. Thus, in effect, the user can carry the directly manipulated source object directly to the intended target object, in the same way that a person in the real world can carry an object in one hand while opening drawers and rearranging items on a desk with the other hand.

BRIEF DESCRIPTION OF THE DRAWINGS

FIG. 7 is a pictorial view similar to FIG. 6 showing further steps of the sequence of the present invention.

FIG. 8 is a flowchart of the initialization routine of the method of the present invention.

FIG. 9 is a flowchart of the LOAD AND RUN DIRECT MANIPULATION PROGRAM routine of FIG. 8.

DESCRIPTION OF THE PREFERRED EMBODIMENT

Figure 1:
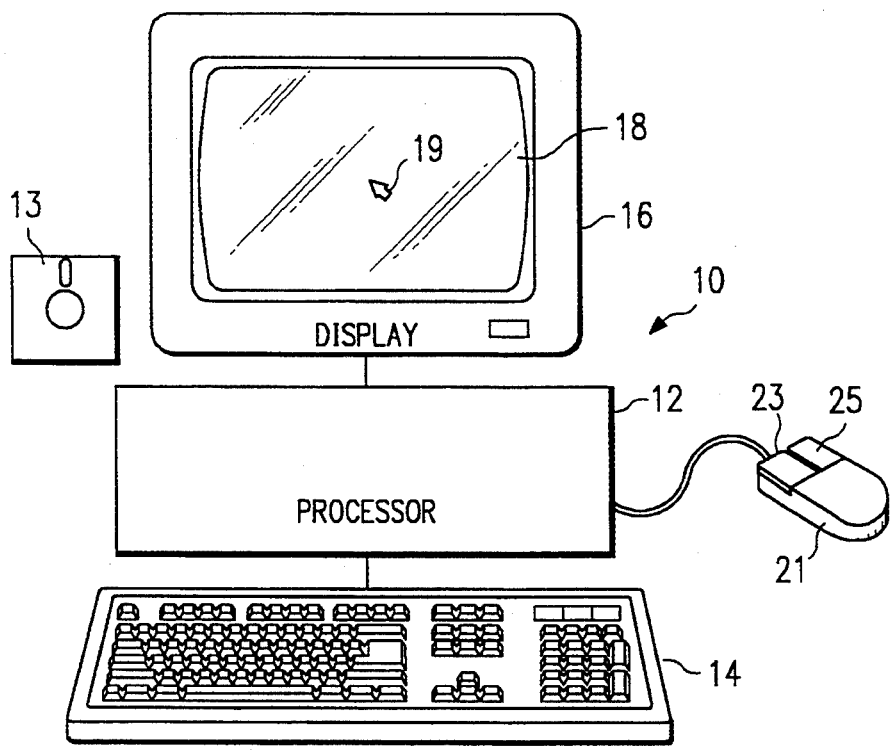
FIG. 1 is a depiction of a data processing system that may be used to implement the method and system of the present invention.

Referring now to the drawings, and first to FIG. 1, there is shown a pictorial representation of a data processing system 10 that may be utilized to implement the method and apparatus of the present invention. Data processing system 10 includes a processor 12 (with an internal central processing unit, read only memory, and random access memory, which are not shown but well known to those skilled in the art) which is coupled to a keyboard 14 and a display device 16 in a manner well known in the art. Processor 12 is adapted to receive removable storage media such as diskette 13 to receive application and other software as well as data. Those skilled in the art will recognize that data processing system 10 may be implemented by using any suitable computer, including a personal computer or a workstation coupled to a host computer. One example of a data processing system that may be used to implement the method and apparatus of the present invention is the IBM PS/2 personal computer.

Referring still to FIG. 1, display screen 18 has displayed thereon a pointer 19 that is used in a manner well known in the art to indicate a selected position upon computer display screen 18. Pointer 19 may be moved about on computer display screen 18 by moving a mouse 21, as is well known in the art. In the preferred embodiment of the present invention, mouse 21 includes at least two buttons, including mouse button number one which is designated by the numeral 23 and mouse button number two which is designated by the numeral 25.

Figure 2:
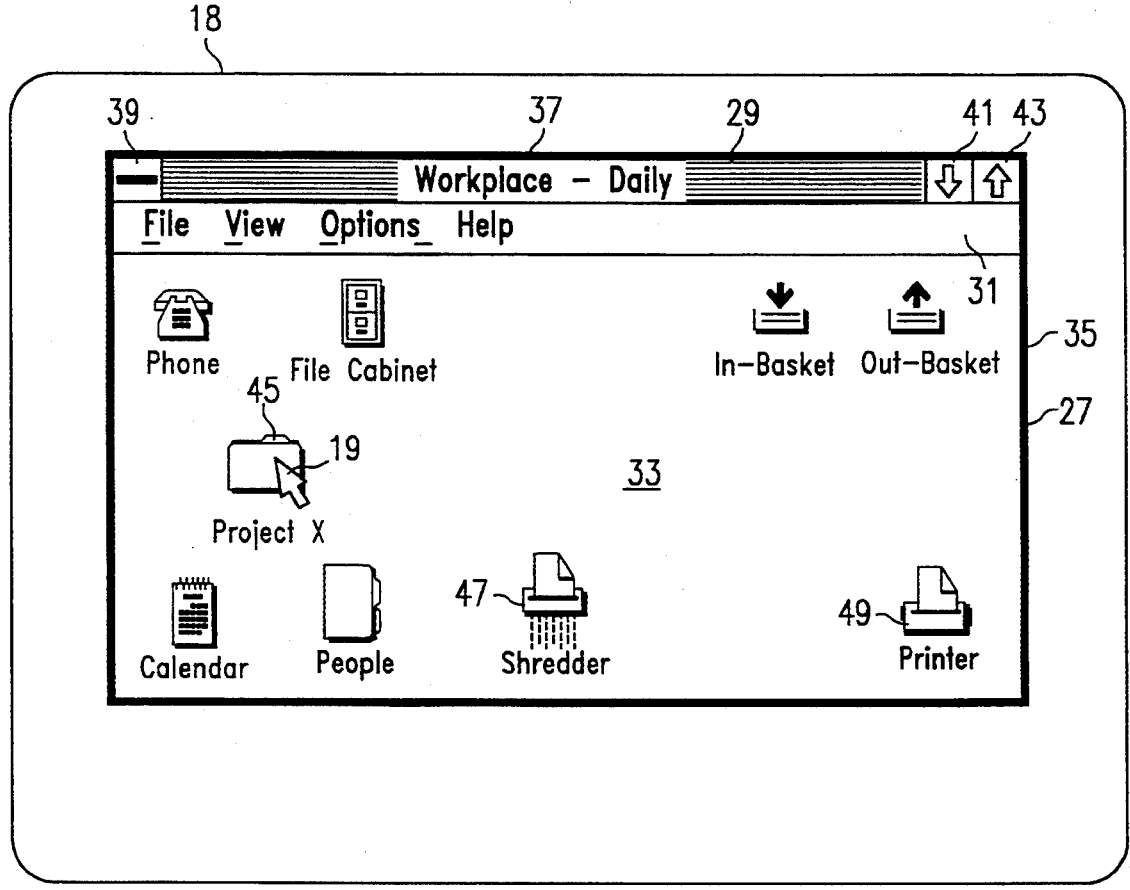
FIG. 2 is a pictorial representation of a computer display screen with a workplace window displayed thereon.

Referring now to FIG. 2, a window 27 is displayed on display screen 18. Window 27 includes a title bar 29, an action bar 31, and a client area 33, all of which are enclosed in a border 35. Title bar 29 includes, in addition to a label 37 that identifies window 27 as the "Workplace-Daily" window, a system menu icon 39, and sizing icons 41 and 43. System menu icon 39 allows the user to display a pull-down menu that contains the actions that the user can perform on a window, such as restoring, moving, or sizing the window. Window sizing icon 41 provides a fast way to use the mouse and pointer 19 to minimize or reduce window 27 to an icon without opening the pull-down menu from system menu icon 39. Similarly, sizing icon 43 allows the user to maximize window 27 to the full extent of screen 18.

Action bar 31 contains a listing of the actions of the application of window 27. For example, the user, by selecting the File action of action bar 31, can display a pull-down menu that includes such actions as OPEN, SAVE or EXIT.

Client area 33 of window 27 is populated with a plurality of icons, including a Project X icon 45, a Shredder icon 47, and a Printer icon 49. Project X folder icon 45 represents a container that contains various documents. Project X folder icon 45 can be opened to display a Folder-Project X window 51, which is shown in FIG. 3, by either pointing to Project X folder icon 45 with pointer 19 and "double clicking" mouse button number one or by selecting icon 45 and then selecting the open action from the File action's pull-down menu of action bar 31.

Shredder icon 47 and Printer icon 49 are device object icons. Shredder icon 47 represents an application that deletes objects. Similarly, Printer icon 49 represents a print application. Thus, a user can, for example, drag Project X folder icon 45 to Shredder icon 47 and thereby delete the Project X object and its contents.

Figure 3:
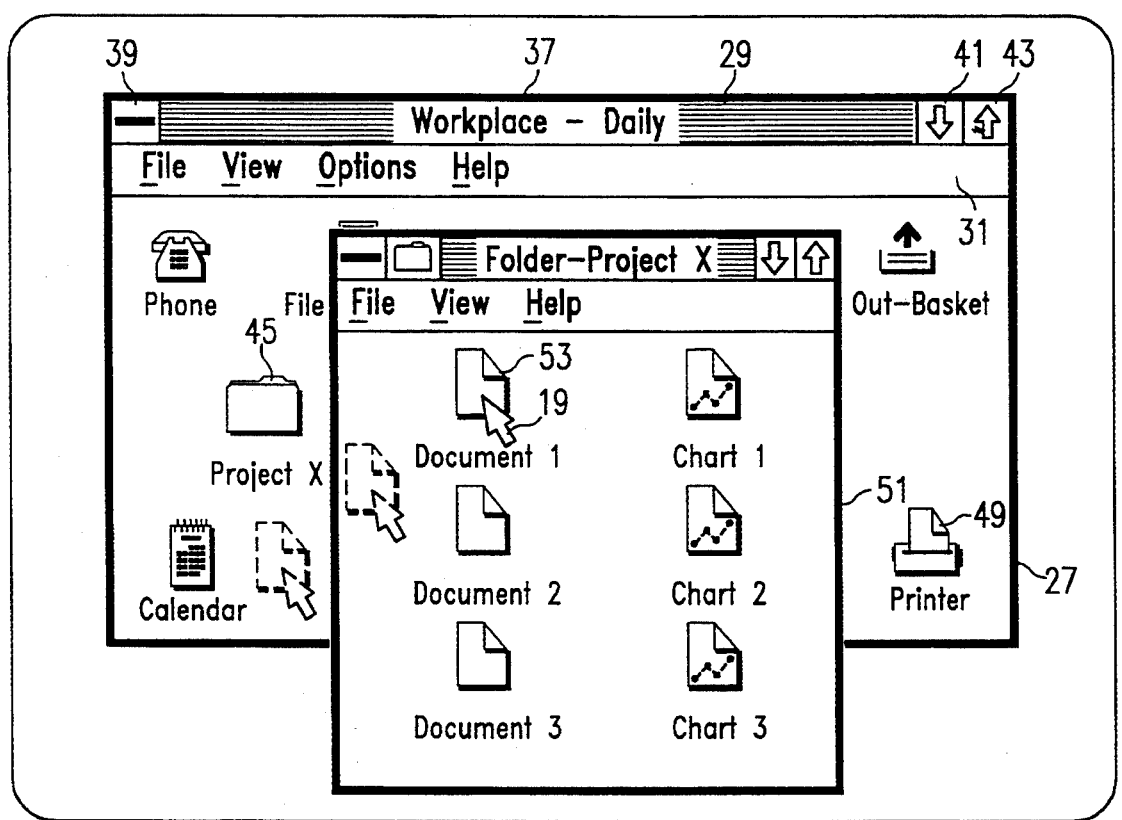
FIG. 3 is a pictorial view, similar to FIG. 2, with a folder window superimposed on the workplace window and illustrating a sequence of operations of the present invention.

Referring now to FIG. 3, Folder-Project X window, which it will be recalled was opened from Project X folder icon 45, contains a plurality of object icons including Document 1 icon 53. Document 1 icon 53 represents a document. Document 1 icon 53 can be opened in the same way that window 51 was opened, thereby to display the contents of Document 1. Similarly, Document 1 can be printed through direct manipulation by dragging it to and dropping it upon Printer icon 49. Also, document 1 can be deleted through direct manipulation by dragging it to and dropping it upon Shredder icon 47. However, in FIG. 3, the portion of window 27 that contains Shredder icon 47 is obscured by window 51, and, therefore, a user cannot simply drag Document 1 icon 53 directly to Shredder icon 47.

In the prior art, direct manipulation was performed by positioning pointer 19 on the source object, for example, Document 1 icon 53, and pressing, as opposed to clicking, mouse button number two. Then, without releasing mouse button number two, the user could move the mouse and thereby move pointer 19 and source object icon 53. When pointer 19 and source object 53 reached the intended target object, for example Printer icon 49, the user could release mouse button number two and thereby drop source object icon 53 on target object icon 49, whereupon the system would, in the illustrated example, print Document 1. In the prior art, if the user wanted to delete Document 1 by direct manipulation, the user would have to rearrange screen 18 such that Document One icon 53 and Shredder icon 47 were visible simultaneously. The user could do this in several ways. For example, the user might be able to move window 51 sideways until Shredder icon 47 became visible. Alternatively, the user could move Document 1 icon 53 from window 51 to, for example, window 27, and then surface window 27, either by clicking mouse button number one on it, or minimizing window 51. Then, the user could drag Document icon 53 to and drop it Upon Shredder icon 47. The action of moving Document 1 icon 53 from window 51 to window 27 takes a substantial amount of time because the location of Document 1 has to be changed in system memory.

In application Ser. No. 07/703,434, filed May 17, 1991, there are disclosed a system and method that overcome some of the shortcomings of the prior art. In the system and method of application Ser. No. 07/703,434, whenever the user directly manipulates an object, the system automatically surfaces whichever window the user happens to be over. Thus, in the example of FIGS. 2-4, if the user were to drag Document 1 icon 53 out of window 51 into window 27, window 27 would automatically be surfaced. Accordingly, the method and system of application Ser. No. 07/703,434 provide some advantages over prior art. However, when several windows are simultaneously opened on the screen, it can be distracting to the user and use substantial system time in repainting the screen as various unwanted windows pop to the surface. Also, the method and system of Ser. No. 07/703,434 are somewhat limited in that they allow the user only to surface windows that are already open and not to open closed windows or reposition windows, or scroll windows, or perform other operations that might be necessary or desirable.

Figure 4:
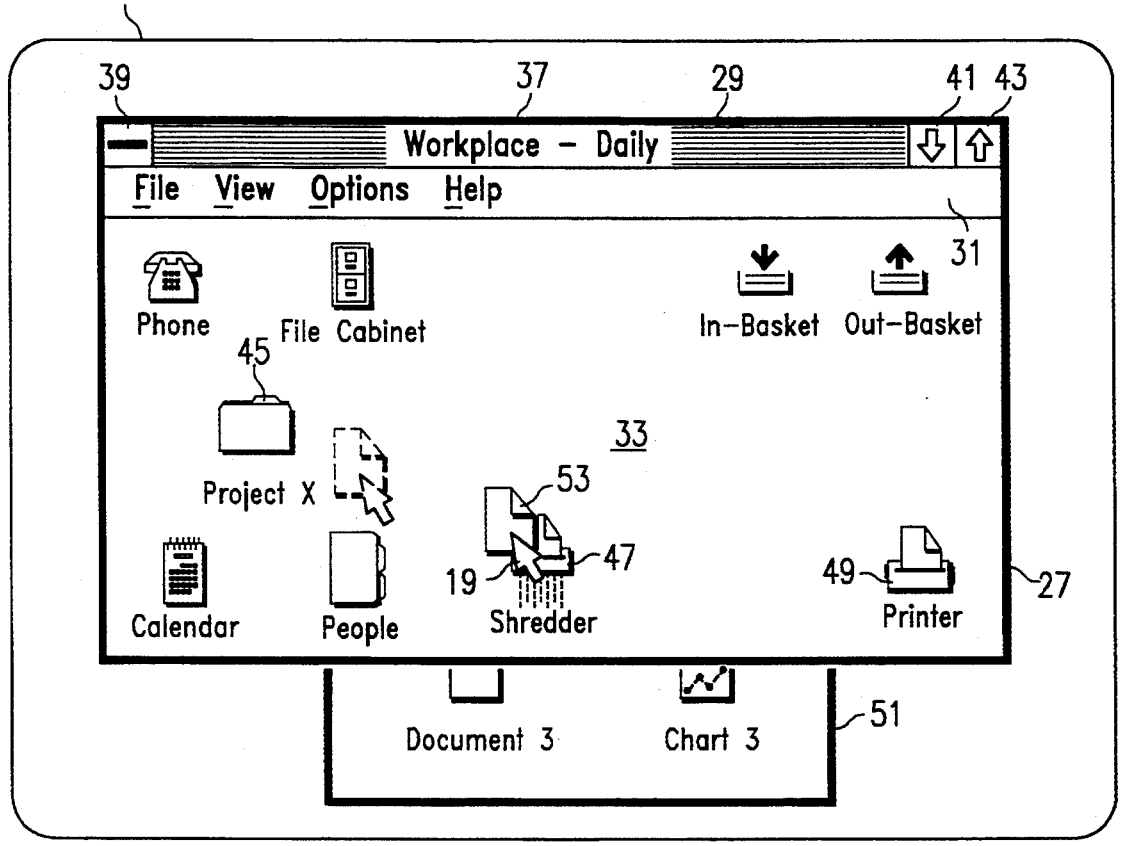
FIG. 4 is a pictorial view similar to FIGS. 2 and 3, with the workplace window superimposed upon the folder window and showing additional steps of the sequence of the method of the present invention.

In the method and system of the present invention, an additional direct manipulation mechanism is provided. Referring to FIG. 3, direct manipulation of Document 1 icon 53 is initiated by pointing to Document 1 icon 53 with pointer 19 and clicking mouse button number two, which is designated by the numeral 25 in FIG. 1. When the user clicks mouse button number two on Document 1 icon 53, pointer 19 and Document 1 icon 53 become attached to each other and will remain so attached until the user again clicks mouse button number two. Thus, the user can move pointer 19, with Document 1 icon 53 attached thereto, anywhere on screen 18 and perform any of the normal mouse operations. As shown in phantom in FIG. 3, the user can move pointer 19, with Document 1 icon 53 attached thereto, out of window 51 and into window 27. However, repositioning pointer 19 and Document 1 icon 53 into window 27 does not result in the automatic surfacing of window 27. However, if the user does desire to surface window 27, the user may do so by clicking mouse button number one, whereupon window 27 will be surfaced, as shown in FIG. 4. The user may then drag Document 1 icon 53 with pointer 19 attached thereto to Shredder icon 47. If the user desires to delete Document 1, the user may do so by clicking mouse button number two, and thereby detaching pointer 19 and dropping Document 1 icon 53 on Shredder icon 47.

Figure 5:
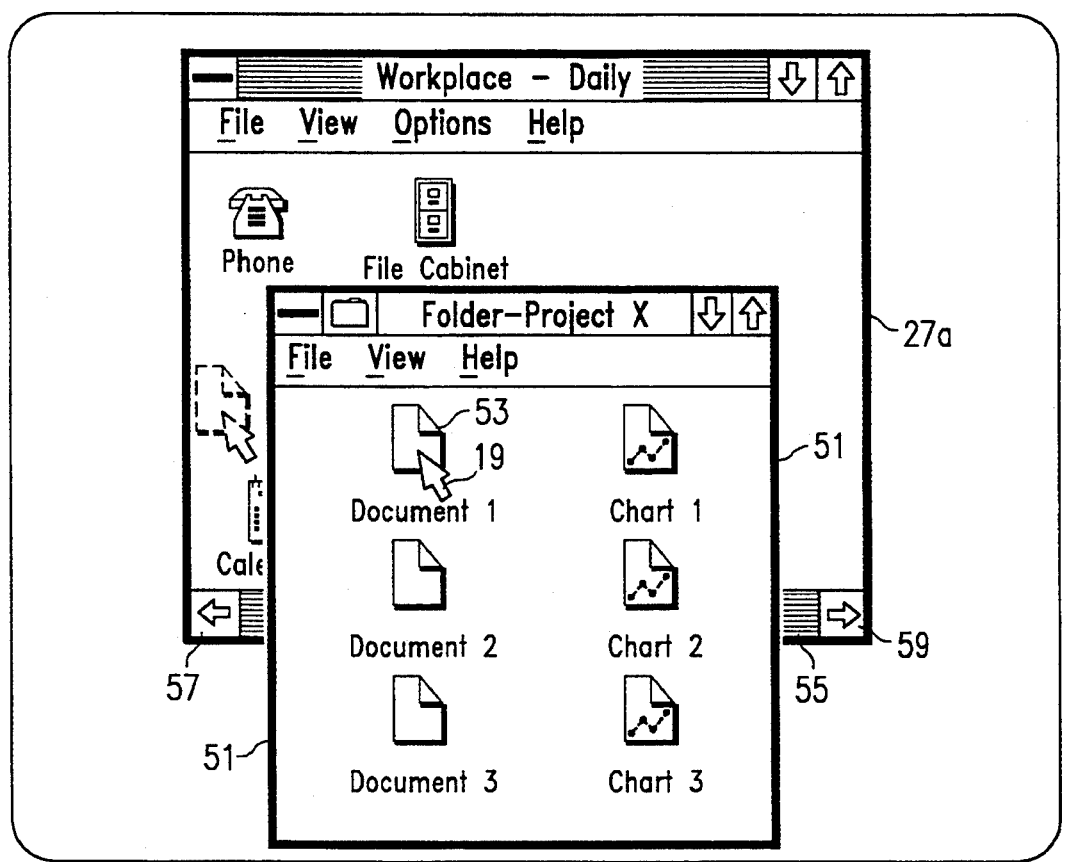
FIG. 5 is a pictorial view of another representation of the folder window superimposed on the workplace window in a computer display screen.
Figure 6:
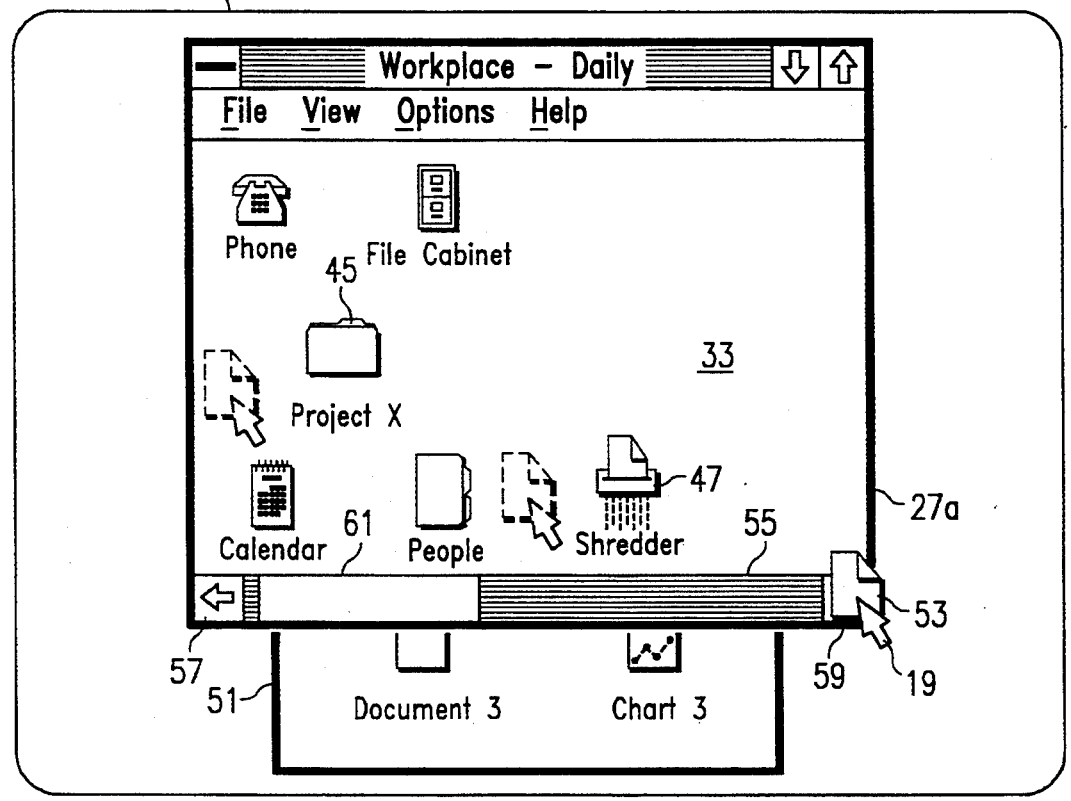
FIG. 6 is a pictorial view similar to FIG. 5 in which the workplace window is superimposed on the folder window showing a sequence of steps of the present invention.

Referring now to FIGS. 5-7, there is shown another example of the system and method of the present invention. In FIG. 5, there is shown a view of the Workplace-Daily window designated by the numeral 27a. Window 27a represents the same workplace as that represented by window 27 of FIGS. 2-4 and it contains the same objects as those displayed in window 27 of FIGS. 2-4. However, as is best illustrated in FIGS. 6 and 7, the viewport formed by a window 27a is narrower than the viewport of window 27 and not all of the object icons in the workplace are visible simultaneously in window 27a. Thus, window 27a includes a scrollbar 55, which indicates that there are items in the workplace that are positioned outside the viewport. Scrollbar 55 includes a left arrow 57 and a right arrow 59. As is well know to those skilled in the art, the user can scroll the data in the viewport of window 27a by means of arrows 57 and 59. A slider box 61 indicates the relationship of the viewport to the objects in the workplace. Thus, in FIG. 6, the viewport of window 27a is positioned at the leftmost end of the objects and in FIG. 7, it is positioned at the rightmost view of the objects.

Referring particularly to FIG. 5, Folder-Project X window 51 is shown superimposed upon Workplace-Daily window 27a. In the example of FIGS. 5-7, the user wishes to print Document 1 by direct manipulation. According to the present invention, the user positions pointer 19 on Document 1 icon 53 and clicks mouse button number two, whereupon Document 1 icon 53 becomes attached to pointer 19. The user may then move pointer 19 with Document 1 icon 53 attached thereto out of window 51 and into window 27a, as shown in phantom in FIG. 5. The user, knowing that the printer icon is located in the workplace window, can surface window 27a by clicking mouse button number one, thereby to arrive at the configuration shown in FIG. 6. However, since window 27a does not show the entire workplace within its viewport, the printer icon is not visible in the view of FIG. 6. According to the invention, the user may then, as illustrated in phantom in FIG. 6, move pointer 19 with Document 1 icon 53 attached thereto to the right arrow box 59 of scrollbar 55 and, by clicking mouse button number one, scroll client area 33 of window 27a until printer icon 49 becomes visible, as shown in FIG. 7. Then, the user can move pointer 19 with Document 1 icon 53 attached thereto to printer icon 49 and, by clicking mouse button number two, cause the system to print Document 1.

It will be recognized that the present invention also supports "normal" direct manipulation, in which mouse button number two is held down until the source object is dropped. An additional benefit of the present invention, however, is that it avoids the problem of current techniques when users have to pick the mouse off of the work surface while still pressing down mouse button number two. For example, users sometimes, in effect, run out of room in which to physically move the mouse while they are moving the pointer on the display screen. When a user does so, the user simply picks up the mouse and repositions it on the work surface so that the user can continue moving the pointer. During direct manipulation, it takes no small amount of manual dexterity to pick up the mouse while continuing to press mouse button number two in the opposite direction. In the present invention, by clicking mouse button number two to attach the pointer to the source object, the user can pick up the mouse without dropping the source object. It should be recognized that a direct manipulation operation according to the present invention may be cancelled at any time by dropping the source object on an invalid target or upon a target that would result in no operation or by pressing the cancel key (not shown) on the keyboard.

Referring now to FIG. 8, there is shown a flowchart of a preferred software implementation of the initialization routine of the present invention. First, at block 61, the system loads and runs a graphical operating system, such as the IBM OS/2 Presentation Manager operating system. Then, the system loads and runs a program or programs that support direct manipulation, which is generally indicated at block 63. Referring to FIG. 9, there is shown details of a preferred load and run direct manipulation program according to the present invention. First, at block 65, drag2 and drag are set equal to false. Drag is the "normal" direct manipulation technique in which mouse button number two is pressed while the pointer is moved about the screen. Drag2 is the direct manipulation technique in which mouse button number two is clicked. After drag2 and drag have been set equal to false, the system loads the program at block 67 and runs the program at block 69. Examples of programs that support direct manipulation include those illustrated in FIGS. 2-7. After the direct manipulation program has been loaded and started to run, the system returns to FIG. 8 to monitor user input at block 71. If, at decision block 73, the user input is a pointing device input, then the system processes pointer input as indicated generally at block 75. If, at decision block 73, the user input is something other than pointing device input, as for example, keyboard input, the system processes the other inputs at block 77 and returns to continue monitoring user input.

Figure 10:
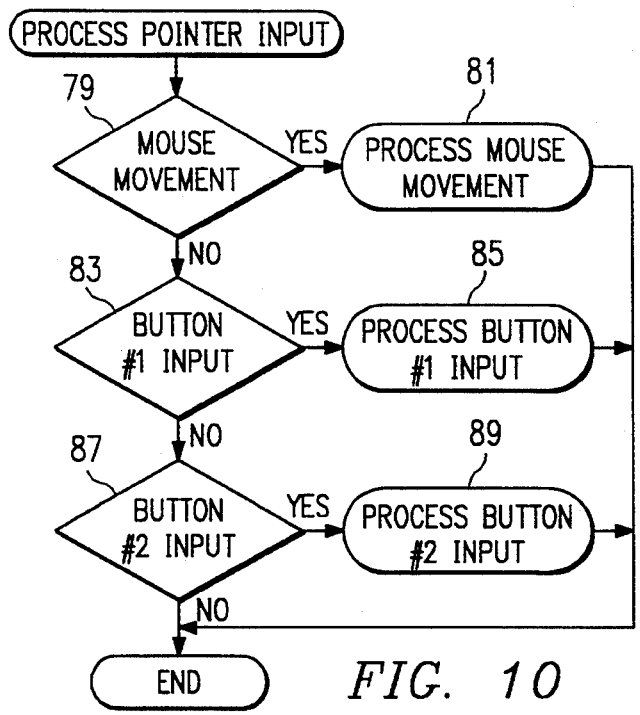
FIG. 10 is a flowchart of the PROCESS POINTER input routine of FIG. 8.

Referring now to FIG. 10, there are shown details of a preferred implementation of the process pointer input routine of the present invention. The system tests at decision block 79 whether or not the pointer input is mouse movement. If it is, the system executes the process mouse movement routine indicated generally at block 81. If, at decision block 79, the pointer input is not mouse movement, the system tests at decision block 83 whether or not the pointer input is a mouse button number one input; if it is, the system executes the process button number one input routine indicated generally at block 85. If the pointer input is not mouse button number one input, then the system tests at decision block 87 whether or not the pointer input is a mouse button number two input, and if it is, the system executes the process button number two input routine indicated generally at block 89.

Figure 11:
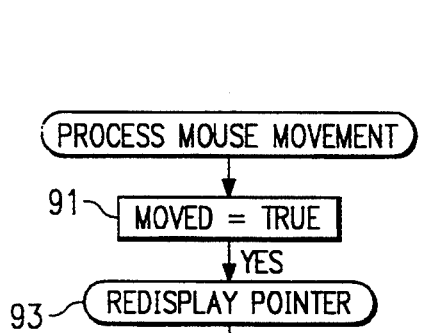
FIG. 11 is a flowchart of the PROCESS MOUSE MOVEMENT routine of FIG. 10.
Figure 12:
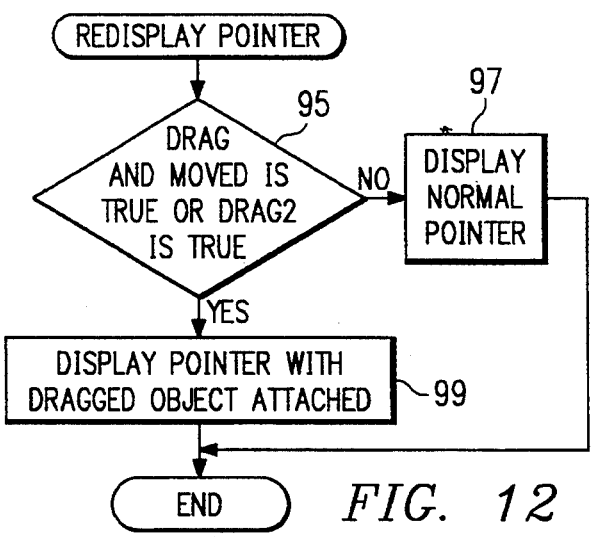
FIG. 12 is a flowchart of the REDISPLAY pointer routine of FIG. 11.

Referring now to FIG. 11, there are shown details of an implementation of the process mouse movement routine of the present invention. First, "moved" is set equal to true at block 91. Then the system executes the redisplay pointer subroutine indicated generally at block 93. Referring to FIG. 12, there is shown a preferred implementation of the redisplay pointer routine of the present invention. First the system tests at decision block 95 whether or not either drag and moved is true or drag2 is true. It will be recalled that in the initialization routine of FIG. 9, drag2 and drag are initially set equal to false. Therefore, initially, the test of decision block 95 fails and the system, at block 97, displays the normal pointer, which is simply a pointer with no icon attached to it, and returns to block 71 of FIG. 8 to continue monitoring user input. If, however, as will be discussed in detail hereinafter, drag has been set to true and moved is true or drag2 has been set to true, the system, at block 99 displays the pointer with the dragged object attached to it and returns to block 71 of FIG. 8 to continue monitoring user input.

Figure 13:
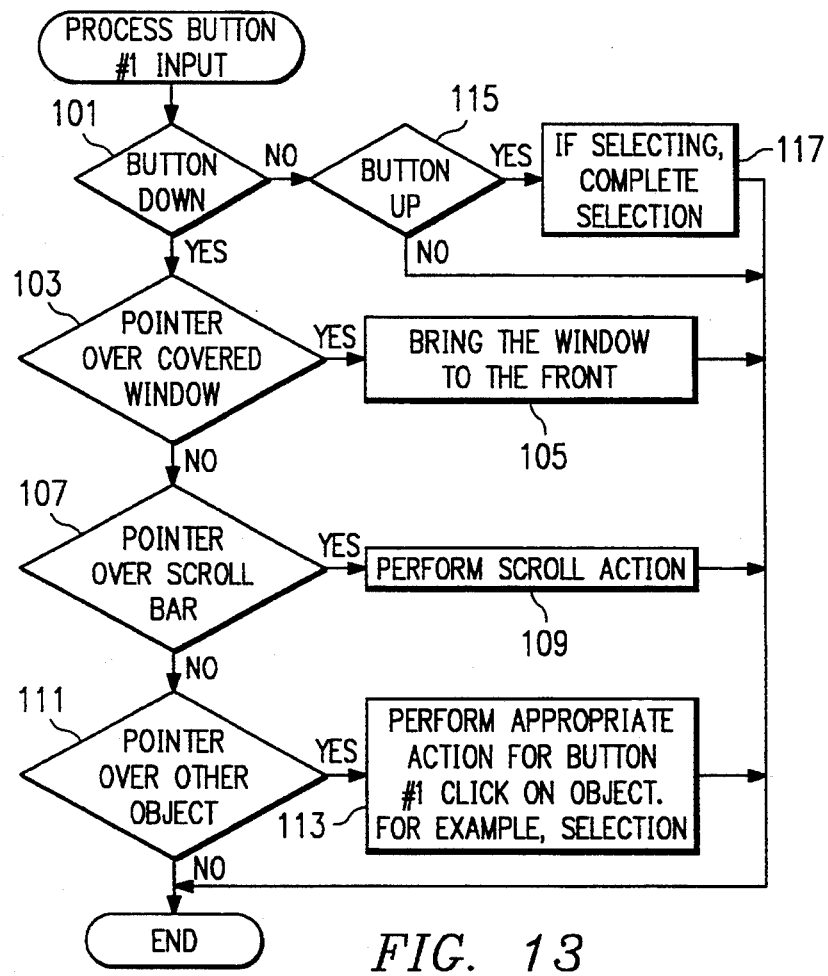
FIG. 13 is a flowchart of the PROCESS BUTTON NUMBER ONE INPUT routine of FIG. 10.

Referring again to FIG. 10, if at decision block 83, the pointer input is a button number one input, then the system executes the process button number one input routine designated generally by the numeral 85 and illustrated in detail in FIG. 13. Referring to FIG. 13 button number one is the normal selection button on a two button mouse and button number one inputs are processed in a manner well known to those skilled in the art. FIG. 13 thus illustrates examples of various mouse button number one interactions. At decision block 101, the system tests whether or not the button number one input is button down. If it is, the system tests at decision block 103 whether or not the pointer is over a covered window and, if it is, the system brings the covered window to the front of the stack of windows at block 105. Then the system returns to block 71 of FIG. 8 to continue monitoring user input. If, on the other hand, the pointer is not over a covered window at decision block 103, the system tests at decision block 107 whether or not the pointer is over a scrollbar. If the pointer is over a scrollbar, the system, at block 109 performs the scroll action and returns to continue monitoring user input. If the pointer is neither over a covered window at decision block 103 nor over a scrollbar at decision block 107, the system tests generally at decision block 111, whether or not the pointer is over some other object. If the pointer is over some other object, the system performs the appropriate action for a button number one click on that object at block 113. Again, button number one input can be any of the well known input such as moving a window, maximizing a window, or minimizing a window. After the button down input has been processed, the system returns to block 71 of FIG. 8 to continue monitoring user input.

Referring again to FIG. 13, if the button number one input is not button down at decision block 101, the system tests at decision block 115 whether the button number one input is button up. If it is, and the action is a selection, the system completes the selection at block 117 and returns to block 71 of FIG. 8 to continue monitoring user input.

Figure 14:
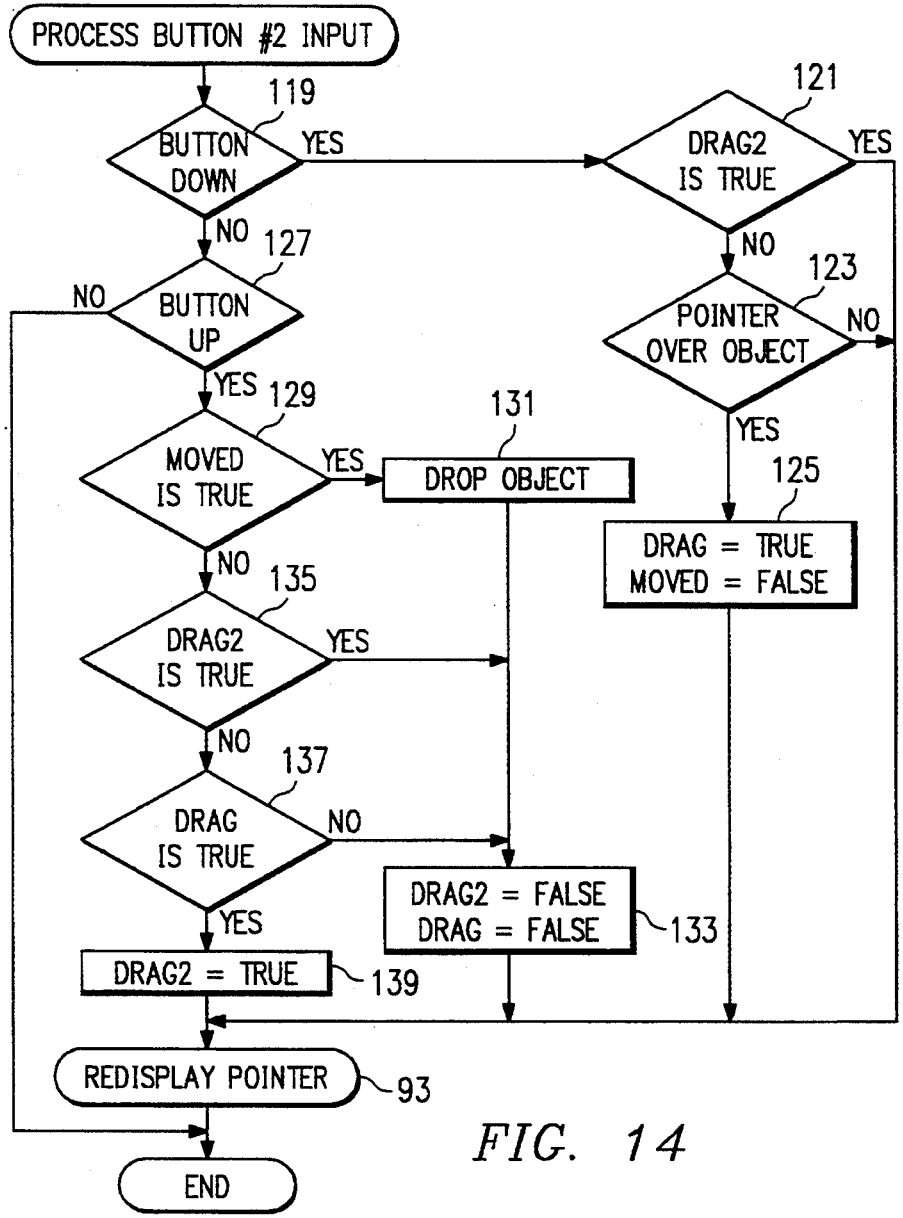
FIG. 14 is a flowchart of the PROCESS BUTTON NUMBER TWO INPUT routine of FIG. 10.

Referring again to FIG. 10, if at decision block 87, the pointer input is a button number two input, then the system processes the button number two input generally at block 89, the details of which are shown in FIG. 14. Referring specifically to FIG. 14, the system tests at decision block 119 whether or not the button number two input is button down. If it is, then the system tests at decision block 121 whether or not drag2 is true. If drag2 is true, then the system executes the redisplay pointer routine indicated generally by the numeral 93 and shown in detail in FIG. 12. It will be recalled that in FIG. 12 that if drag2 is true, then the pointer is redisplayed with the dragged object attached at block 99. However, it will also be recalled that when the system is initialized at FIGS. 8 and 9, drag2 and drag are set equal to false. Thus, initially, the test of decision block 121 fails, and the system tests at decision block 123 whether or not the pointer is over an object. If it is not, the system executes the redisplay pointer routine of block 93 and returns. However, if, at decision block 123, the pointer is over an object, then drag is set to true and moved is set to false at block 125. Then, the system again executes the redisplay pointer routine of FIG. 12. Referring again to FIG. 12, the system tests at decision block 95 whether or not either drag and moved is true or drag2 is true. Since drag has been set to true but moved has been set to false and drag2 is false, the system displays the normal pointer at block 97. What this means is that the system does not attach the pointer to the dragged object on a normal button two down drag unless there is also movement. Referring to FIG. 11, if there is mouse movement, then moved is set to true at block 91 and then the system executes the redisplay pointer routine of block 93. Referring again to FIG. 12, since drag and moved are now both true, the system displays the pointer with the dragged object attached at block 99 and returns to block 71 of FIG. 8 to continue monitoring user input.

Referring again to FIG. 14, if, at decision block 127, the button number two input is button up, the system tests at decision block 129 whether or not moved is true. If the input is button two up and moved is true, then the system drops the object at block 131, drag2 and drag are reset to equal false at block 133, and the system executes the redisplay pointer routine at block 93. Referring briefly to FIG. 12, since drag and drag2 are reset to equal false, the system displays the normal pointer at block 97. Referring again to decision block 129 of FIG. 14, if moved is not true, then the system tests at decision block 135 whether or not drag2 is true. Again, initially drag2 is false. Therefore, the system tests at decision block 137 whether or not drag is true. If drag is true, then drag2 is set equal to true at block 139 and the system again executes the redisplay pointer routine of block 93. Referring again to FIG. 12, if, at decision block 95, drag2 is true, then the system displays the pointer with the dragged object attached at block 99. Referring back to FIG. 14, if, at decision block 135, drag2 is true, which indicates that it had been previously set to true by clicking mouse button number two on an object, drag2 and drag are set to false at block 133 and the system again executes the redisplay pointer routine at block 93. Referring again to FIG. 12, since drag2 and drag are both false, the system displays the normal pointer.

The direct manipulation actions of the present invention can best be understood by taking specific examples through the logic of FIGS. 10–12 and 14, recalling that at block 65 of FIG. 9 drag2 and drag are initially set to false. As a first example, assume that the user is performing a "normal" drag, which comprises the physical steps of pressing mouse button two while the pointer is on a source object, moving the mouse while continuing to press button two, which drags the source object across the display screen, and releasing mouse button number two, which drops the source object at a target location. Referring to FIG. 14, if the system receives a button two down input at decision block 119, the system tests at decision block 121 whether or not drag2 is true. Since it is not, the system tests at decision block 123 whether or not the pointer is over an object. Since this example is a "normal" drag, the pointer is over an object, therefore, at block 125, drag is set to true, moved is set to false, and the system executes the redisplay pointer sub-routine of FIG. 12. Since we have just set drag equal to true but moved equal to false, the test of decision block 95 fails and the system continues to display the normal pointer at decision block 97. After the user has pressed mouse button number two in the normal drag the user next moves the mouse. Accordingly, at decision block 79 of FIG. 10 the system processes the mouse movement as shown in FIG. 11 by setting moved equal to true at block 91 and, referring to decision block 95 of FIG. 12, drag and moved are now both true so the system displays the pointer with the dragged object attached at block 99.

When the user reaches the target location, the user releases button number two, which results in a "yes" at decision block 127 of FIG. 14. The system tests, at decision block 129, whether or not moved is true. Since it has been set to true by virtue of the mouse movement, the system drops the object at block 131 and resets drag2 and drag equal to false at block 133.

In the "click-click" direct manipulation of the present invention, the user presses and releases (clicks) mouse button number two while the pointer points to the source object, which attaches the pointer to the source object, and then moves the mouse, which drags the source object with the pointer, to a target location, and then presses and releases (clicks) the mouse button number two, which drops the source at the target. In the flowcharts, at decision block 119 of FIG. 14, when button two is pushed down, the system tests, at decision block 121, whether or not drag2 is true. Since, initially, it is not, the system tests at decision block 123 whether or not the pointer is over an object. Since it is, drag is set to true and moved is set to false at block 125 and the system tests at decision block 95 of FIG. 12 whether or not drag and moved or drag2 are true. Since, at this point, they are not, the normal pointer is displayed at block 97. Since the user is "clicking" mouse button number two, the next user input that is received is button two up at decision block 127 of FIG. 14. The system tests at decision block 129 whether moved is true, which it is not. Thus, the system tests at decision block 135 whether drag2 is true, and again, it is not. Therefore, the system tests at decision block 137 whether or not drag is true. It will be recalled that drag was set to true when mouse button number two was pressed. Therefore, drag2 is set to true at block 139 and the system executes the re-display pointer sub-routine of FIG. 12. Since drag2 has been set to true, decision block 95 yields a "yes" so the system displays the pointer with the dragged object attached at block 99. Then, the system responds to mouse movement input by continuing to display the pointer with the dragged object attached at block 99. When the user reaches the target location the user clicks mouse button number two, which the system perceives initially as a button two down user input at decision block 119 of FIG. 14. The system tests at decision block 121 whether or not drag2 is true and, since it is, the system executes the re-display pointer routine of FIG. 12 and continues to display the pointer with the dragged object attached to it at block 99.

The second half of a click is a mouse button two up. Accordingly, the system tests at decision block 129 whether or not moved is true, and since it is, the object is dropped at block 131 and drag2 and drag are set to false at block 133. It should be noted that there may be an instance where the user clicks mouse button two, thereby attaching the pointer to the dragged object, and then decides to drop the object in the same place rather than drag it. That situation is handled by a "no" answer at decision block 129. The system then tests at decision block 135 whether or not drag2 is true. Since the user had previously clicked on the object, drag2 is true. Therefore, drag2 and drag are set to false at block 133 and the system, at block 97 of FIG. 12, displays the normal pointer.

From the foregoing, it may be seen that the present invention provides new functionality that is easy to learn and use with familiar graphical techniques. The user's ability to perform operations by direct manipulation is greatly expanded with the present invention. While the invention has been particularly shown and described with reference to a preferred embodiment, it will be understood by those skilled in the art that various changes in form and detail may be made therein without departing from the spirit and scope of the invention.

What is claimed is:

1. A method of manipulating an icon in a data processing system having a plurality of other software objects displayed on a display screen which may be selected and manipulated utilizing a visual pointer, said plurality of other software objects including a partially obscured window which comprises the steps of:
    attaching a visual pointer to said icon;
    moving said visual pointer with said icon attached thereto about said display screen; and
    selecting and manipulating one of said other software objects with said visual pointer while said icon remains attached thereto, said selecting and manipulating step including surfacing said partially obscured window.

2. The method as claimed in claim 1, wherein:
    said plurality of other software objects includes a window; and
    said selecting and manipulating step includes scrolling data in said window.

3. The method as claimed in claim 1, including the step of:
    detaching said visual pointer from said icon.

4. The method as claimed in claim 1, including the steps of:
    positioning said visual pointer with said icon attached thereto over a target icon;
    detaching said visual pointer from said icon while said icon is over said target icon; and,
    performing an action on the object represented by said icon in response to detaching said icon from said visual pointer over said target icon.

5. In a data processing system including a display screen and a mouse device for moving a visual pointer about said display screen, said mouse device including at least two buttons, a method of manipulating an icon displayed on said display screen, which comprises the steps of:
    pointing to said icon with said visual pointer;
    pressing and releasing one of said mouse buttons while said visual pointer is pointing to said icon;
    attaching said visual pointer to said icon in response to pressing and releasing said one mouse button;
    moving said visual pointer with said icon attached thereto about said display screen with said one mouse button released; and,
    performing another mouse operation while said visual pointer is attached to said icon, said mouse operation comprising:
        pointing to a partially obscured window with said visual pointer; and, clicking the other of said mouse buttons, thereby to surface said partially obscured window.

6. The method as claimed in claim 5, including the steps of:
    pressing and releasing said one mouse button while said visual pointer is attached to said icon; and,
    automatically detaching said visual pointer from said icon in response to pressing and releasing said one mouse button while said pointer is attached to said icon.

7. In a data processing system including a display screen and a mouse device for moving a visual pointer about said display screen, said mouse device including at least two buttons, a method of manipulating an icon displayed on said display screen, which comprises the steps of:
    pointing to said icon with said visual pointer;
    pressing and releasing one of said mouse buttons while said visual pointer is pointing to said icon;
    attaching said visual pointer to said icon in response to pressing and releasing said one mouse button;
    moving said visual pointer with said icon attached thereto about said display screen with said one mouse button released; and,
    performing another mouse operation while said visual pointer is attached to said icon, said mouse operation comprising:
        pointing to a scroll bar in a window with said visual pointer; and,
        clicking the other of said mouse buttons, thereby to scroll data in said window.

8. The method as claimed in claim 7, including the steps of:
    pressing and releasing said one mouse button while said visual pointer is attached to said icon; and
    automatically detaching said visual pointer from said icon in response to pressing and releasing said one mouse button while said pointer is attached to said icon.

9. In a data processing system including display screen and a mouse device for moving a visual pointer about said display screen, said mouse device including at least two buttons, the improvement which comprises:
    means for attaching said visual pointer to an icon in response to pressing and releasing one of said mouse buttons; and
    means for performing another mouse operation while said visual pointer is attached to said icon, said means for performing another mouse operation while said pointer is attached to said icon comprising means for surfacing a partially obscured window in response to clicking the other of said mouse buttons.

10. The data processing system as claimed in claim 9, including:
    means for automatically detaching said visual pointer from said icon in response to pressing and releasing said one mouse button while said visual pointer is attached to said icon.

11. In a data processing system including display screen and a mouse device for moving a visual pointer about said display screen, said mouse device including at least two buttons, the improvement which comprises:
    means for attaching said visual pointer to an icon in response to pressing and releasing one of said mouse buttons; and
    means for performing another mouse operation while said visual pointer is attached to said icon, said means for performing another mouse operation while said pointer is attached to said icon comprising means for scrolling data in a window in response to clicking the other of said mouse buttons.

12. The data processing system according to claim 11, including:
    means for automatically detaching said visual pointer from said icon in response to pressing and releasing said one mouse button while said visual pointer is attached to said icon.

* * * * *